United States Patent
Fukai et al.

(10) Patent No.: US 6,546,186 B2
(45) Date of Patent: Apr. 8, 2003

(54) VIDEO/AUDIO INFORMATION COLLECTING SYSTEM USING VIDEO CAMERA AND ITS EDITING SYSTEM

(75) Inventors: Toshihiko Fukai, Katano (JP); Masataka Higuchi, Toyono-gun (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/029,950
(22) PCT Filed: Sep. 10, 1996
(86) PCT No.: PCT/JP96/02564
§ 371 (c)(1), (2), (4) Date: Mar. 10, 1998
(87) PCT Pub. No.: WO97/10673
PCT Pub. Date: Mar. 20, 1997

(65) Prior Publication Data
US 2001/0031131 A1 Oct. 18, 2001

(30) Foreign Application Priority Data
Sep. 11, 1995 (JP) .............................. 7-232188
Sep. 11, 1995 (JP) .............................. 7-232189

(51) Int. Cl.[7] .................................. H04N 5/93
(52) U.S. Cl. .................. 386/52; 386/117; 358/906; 358/909.1
(58) Field of Search .............. 386/4, 46, 52, 386/55, 57, 59–62, 64; 345/327–328; 360/13; 369/83; 348/231, 232, 86; 358/906, 909.1; 709/315

(56) References Cited

U.S. PATENT DOCUMENTS

| | | | |
|---|---|---|---|
| 4,413,277 A | * 11/1983 | Murray | 348/86 |
| 4,685,003 A | * 8/1987 | Westland | 386/52 |
| 4,774,600 A | * 9/1988 | Baumeister | 386/55 |
| 4,899,229 A | 2/1990 | Hashimoto | |
| 5,459,582 A | 10/1995 | Takahashi | |
| 5,467,288 A | * 11/1995 | Fasciano et al. | 345/328 |
| 5,806,072 A | * 9/1998 | Kuba et al. | 348/231 |
| 6,002,850 A | * 12/1999 | Sumino et al. | 709/315 |
| 6,038,367 A | * 3/2000 | Abecassis | 386/46 |

FOREIGN PATENT DOCUMENTS

| | | |
|---|---|---|
| JP | 6-121267 | 4/1994 |
| JP | 6-295565 | 10/1994 |

\* cited by examiner

Primary Examiner—Thai Tran
Assistant Examiner—Christopher Onuaku
(74) Attorney, Agent, or Firm—Wenderoth, Lind & Ponack, L.L.P.

(57) ABSTRACT

The present invention provides a VTR collecting system in which various data such as, for example, a representative still picture, start time, stop time, OK/NG flag, etc., of each scene is recorded as editorial base data to the memory card when collecting, and a position of each necessary scene can be searched for with references to the recorded editorial base data without reproducing the video tape from the start to the end at the time of editing, and therefore, the editorial work can be performed quickly and easily.

17 Claims, 14 Drawing Sheets

Fig. 3

| Cut number | Still picture data | Start time | Stop time | OK/NG flag |
|---|---|---|---|---|
| 1 | Still picture data of cut No.1 | Start time of cut No.1 | Stop time of cut No.1 | OK |
| 2 | Still picture data of cut No.2 | Start time of cut No.2 | Stop time of cut No.2 | NG |
| 3 | Still picture data of cut No.3 | Start time of cut No.3 | Stop time of cut No.3 | NG |
| 4 | Still picture data of cut No.4 | Start time of cut No.4 | Stop time of cut No.4 | OK |

VTR collecting system

VTR editing system

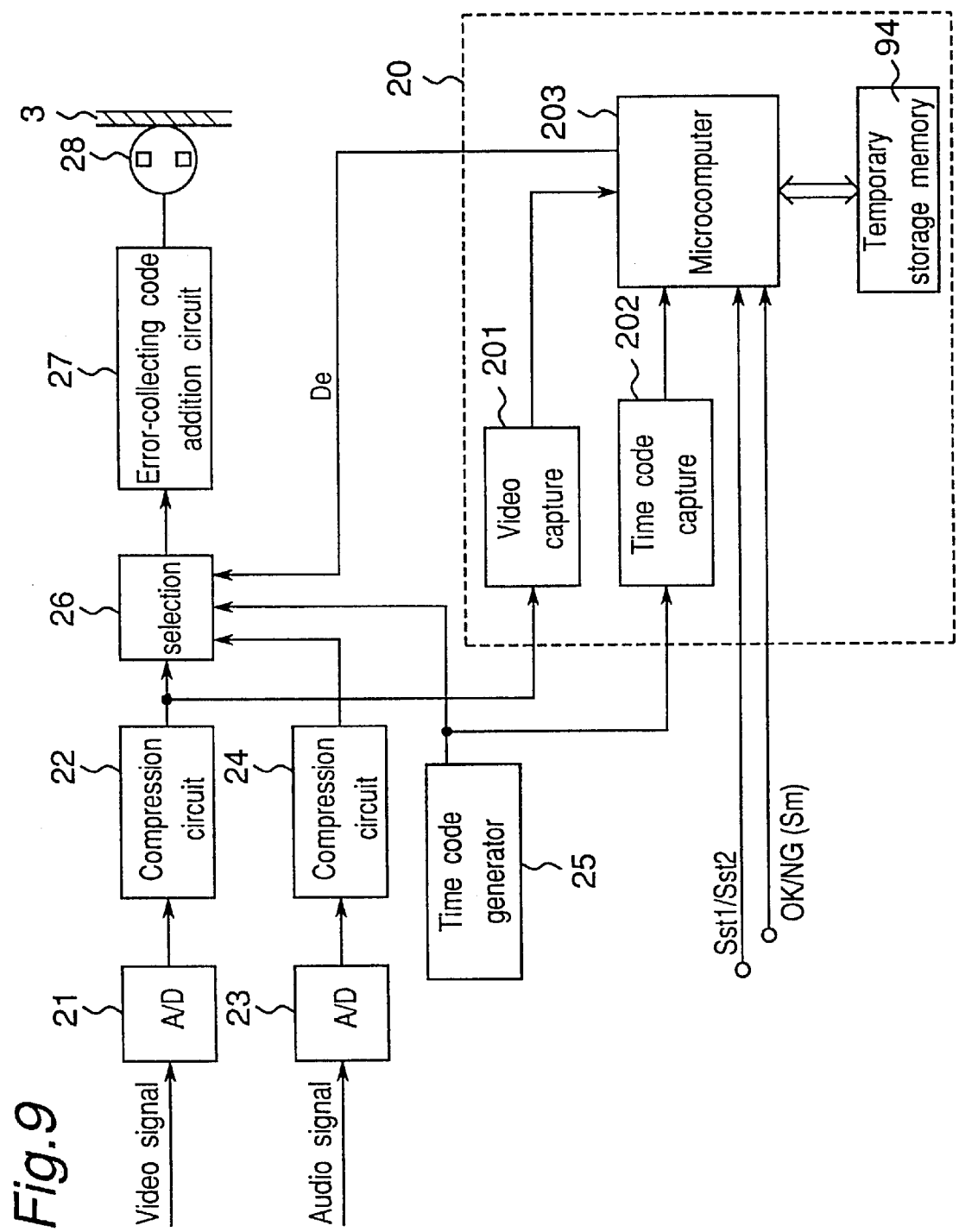

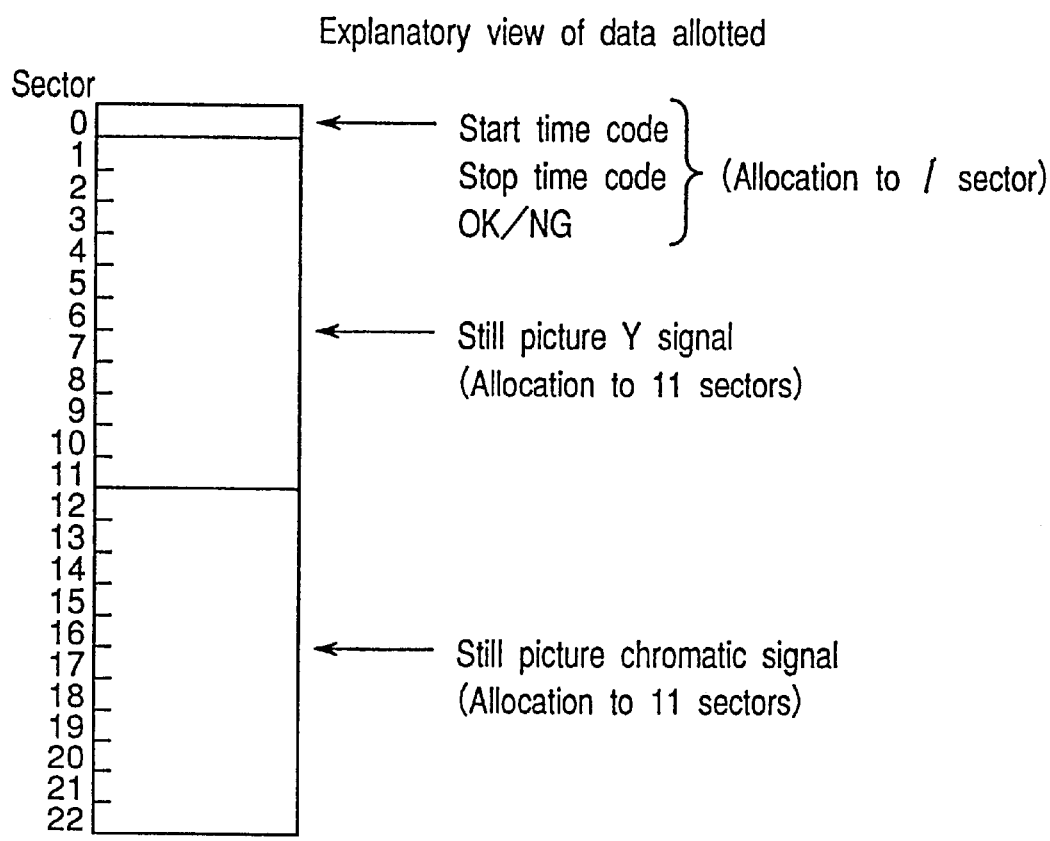

VIDEO/AUDIO INFORMATION COLLECTING SYSTEM USING VIDEO CAMERA AND ITS EDITING SYSTEM

TECHNOLOGICAL FIELD

The present invention relates to a video/audio information collecting system using a video camera and an editing system thereof, and more particularly, to a collecting-editing VTR system whereby editorial auxiliary data such as information of a time code, a representative still image of each cut scene, etc. are stored in a camera incorporated VTR when the scene is photographed thereby to facilitate quick and easy editorial work with reference to the editorial auxiliary data at the time of editing.

TECHNOLOGICAL BACKGROUND

In the case of producing a storytelling video program based on a tape photographed and recorded by a camera incorporated VTR, it is routine to use and edit only necessary scenes from many scenes in the tape to form one program. For detecting where the necessary scenes are located in the tape subjected to collection, the tape is once reproduced in an edition process to take notes of recorded contents and positions of the contents in the tape to take approximate aim.

It is required in the conventional camera-VTR system and VTR editing system to reproduce the tape once totally from the beginning to the last scene as described hereinabove, and therefore there exists a problem in that a preparation work for the edition of the tape takes a large amount of time.

The present invention is devised to solve the aforementioned inconvenience, and has for its object to provide a system allowing quick positional detection of necessary scenes in a recorded tape without reproducing the tape from the start to the end and achieving easy and speedy edition of the tape.

SUMMARY OF THE INVENTION

In order to accomplish the above object, a video/audio information collecting system of the present invention comprises: video camera section (VC) for photographing an object and taking video and audio information of the object; a data recording/reproducing section (VTR) for recording and reproducing the video and audio information taken by the video camera section to a recording medium; an auxiliary data memory section (MEM) for storing editorial auxiliary data to be referred to in a process when the video/audio information recorded in the data recording-reproducing section is edited; and a memory control section (MCR) for controlling the auxiliary data memory section, wherein, when the video and audio information is recorded by the data recording/reproducing section, the editorial auxiliary data is written into the auxiliary data memory section under the control of the memory control section and wherein the auxiliary data memory section includes an IC memory card or a temporary storage means for temporarily storing the editorial auxiliary data.

A video/audio information editing system according to the present invention comprises: an edition source VTR having a main information recording medium loaded thereto for reading and reproducing data of video and audio information already recorded and collected in the main information recording medium; an editor VTR, coupled to the edition source VTR, to which the data recorded in the main information recording medium is transferred for dubbing; a system controller for reading editorial auxiliary data from an auxiliary data recording medium recording the editorial auxiliary data, thereby controlling the edition source VTR and editor VTR with reference to the editorial auxiliary data, wherein a main information portion necessary for an edition among the data recorded in the main information recording medium loaded to the edition source VTR is dubbed to execute the editing operation. The system controller has a monitor display which displays at least one of still picture data, a start time, a stop time, an OK/NG flag for each cut number as the read editorial auxiliary data in one display block area, so that a plurality of display blocks are arranged and displayed on one display screen.

A video tape is used as the main information recording medium, and a detachable IC memory card is applied as the auxiliary data recording medium, and the editorial auxiliary data recorded therein is read out, alternatively, the video tape itself includes the auxiliary data recording medium for recording the editorial auxiliary data, whereby the system controller reads the editorial auxiliary data along with the main information from the source VTR.

In a first aspect of the present invention, a representative still picture, start time, stop time, OK/NG flag, etc. of each cut scene is recorded as editorial base data to the memory card when collecting, and a position of each necessary scene can be searched for with reference to the recorded editorial base data without reproducing the video tape from the start to the end at the time of editing, and therefore, the editorial work can be performed quickly and easily.

In a second aspect of the present invention, the editorial base data when collected is recorded to the video tape itself, and a position of a necessary cut scene can hence be searched for promptly and easily without using a memory card, and thus, the obtained VTR editing system is of remarkably high efficiency in practical use from a point of view of edition work.

BRIEF DESCRIPTION OF THE DRAWINGS

FIG. 3 is a data format to be recorded in a memory medium of the VTR collecting system of the present invention;

FIG. 9 is a block diagram of a constitution of the VTR collecting system in the second embodiment;

FIG. 14 is a diagram indicating how data of one cut scene are allotted in the sectors of FIG. 13.

DETAILED DESCRIPTION OF THE PREFERRED EMBODIMENTS

Figure 1A:
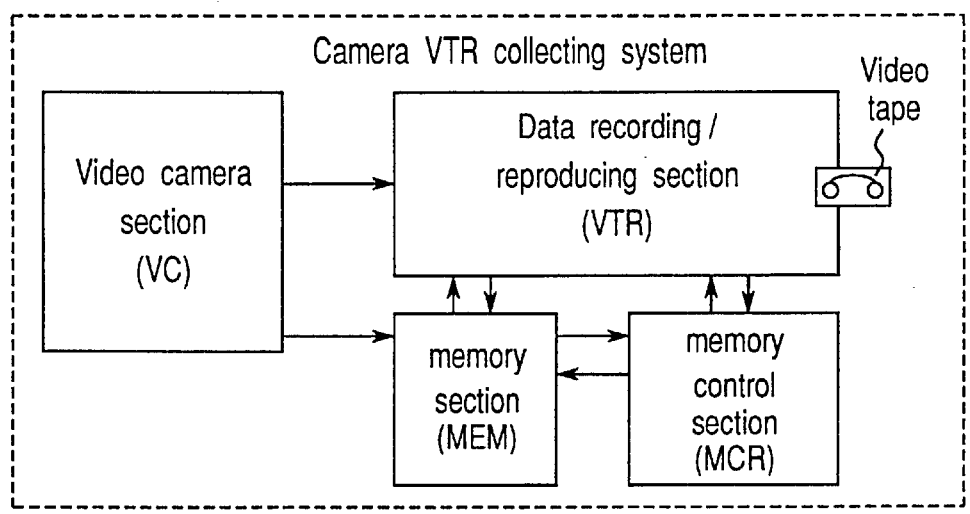
FIG. 1A is a diagram showing a basic constitution of a camera-VTR collecting system according to the present invention.

Embodiments of the present invention will be described with reference to the accompanying drawings. Meanwhile, like parts are designated by like reference numerals, with the description thereof omitted herein for the sake of brevity.

Generally, according to a high-quality digital component recording method, color signals and luminance signals are recorded separately and digitally, so that high-quality images of superior dubbing characteristics are obtained, and the high-quality images are realized because of the adoption of a data compression method in digital recording of images, which goes the same in embodiments of the present invention as in the conventional one.

FIG. 1A shows a basic constitution of a camera-VTR collecting system according to the present invention, wherein the camera-VTR collecting system has a video camera section (VC) for photographing an object and taking main information such as video and audio of the object, a data recording-reproducing section (referred to as VTR hereinafter) for recording/reproducing the video and audio information taken in by the video camera section, an auxiliary data memory section (MEM) and a memory control section (MCR) for controlling the auxiliary data memory section. The MEM is provided to store editorial auxiliary data (described as editorial base data below) to be referred to when the video and audio information recorded by the VTR are edited in a VTR editing system, and the editorial base data which will be detailed later are written to the auxiliary data memory section (MEM) when the data recording-reproducing section (VTR) records the video and audio information.

First Embodiment

Figure 1B:
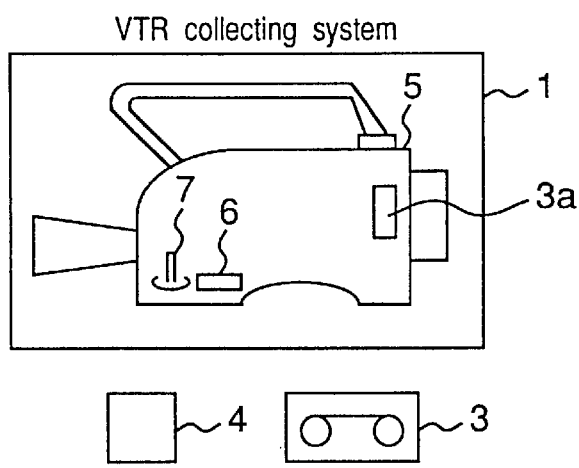
FIGS. 1B and 1C are diagrams of basic constitutions of a camera incorporated VTR collecting system and a VTR editing system according to a first embodiment of the present invention.
Figure 1C:
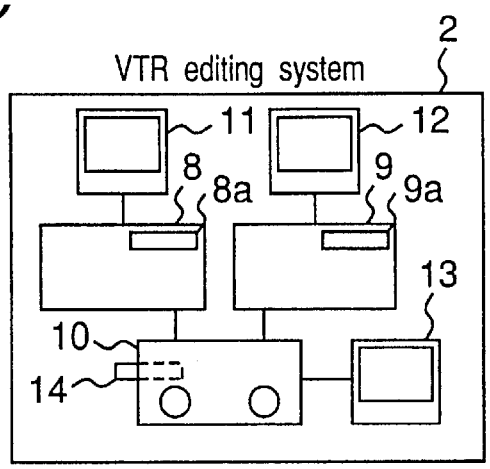

FIGS. 1B and 1C show respective basic constitutions of a camera-incorporated VTR collecting system and a VTR editing system according to a first embodiment of the present invention. 1 is the VTR collecting system and 2 is the VTR editing system, where in a camera-incorporated VTR 5, a video tape 3 is loaded to a tape loading part 3a to record main information such as video and audio, etc. A memory-device for storing editorial base data to be described later, etc. is, for instance, a detachable IC memory card 4 which is inserted into a memory card slot 6 of the camera-incorporated VTR 5, so that the editorial base data or the like are written to the memory card when executing photograph and record. 7 is an OK/NG judgment switch for judging and designating an OK/NG flag to indicate whether or not photographed images are utilizable in an edition process afterwards. For example, if an announcer makes a mistake during an interview, the scene cannot be used and the NG flag should be turned ON and the NG judgment is input in this case through the manipulation of the switch 7.

In FIG. 1C, in the VTR editing system 2, 8 is an edition source VTR, and the video tape 3 after collecting information is loaded to a tape loading part 8a of VTR 8 to reproduce main information recorded therein. 9 is an editor VTR which extracts only necessary portions for the program from video or audio reproduced at the edition source VTR 8, dubs to a dubbing master tape 9a and obtains a video tape of a story.

10 is an editing system controller controlling the edition source VTR 8 and editor VTR 9. 11 and 12 are monitor TVs to confirm reproduced video or audio data, etc. at VTRs 8 and 9, respectively. 13 is a monitor display for the system controller 10, and an operator controls VTRs 8 and 9 with the use of the system controller 10 while confirming a screen displayed on the monitor display 13. The controller 10 has a slot 14 formed to receive the memory card 4, and at the edition time, the memory card 4 with the editorial base data written therein by the collecting system 1 is inserted into the slot 14 to execute the editing operation.

Figure 2:
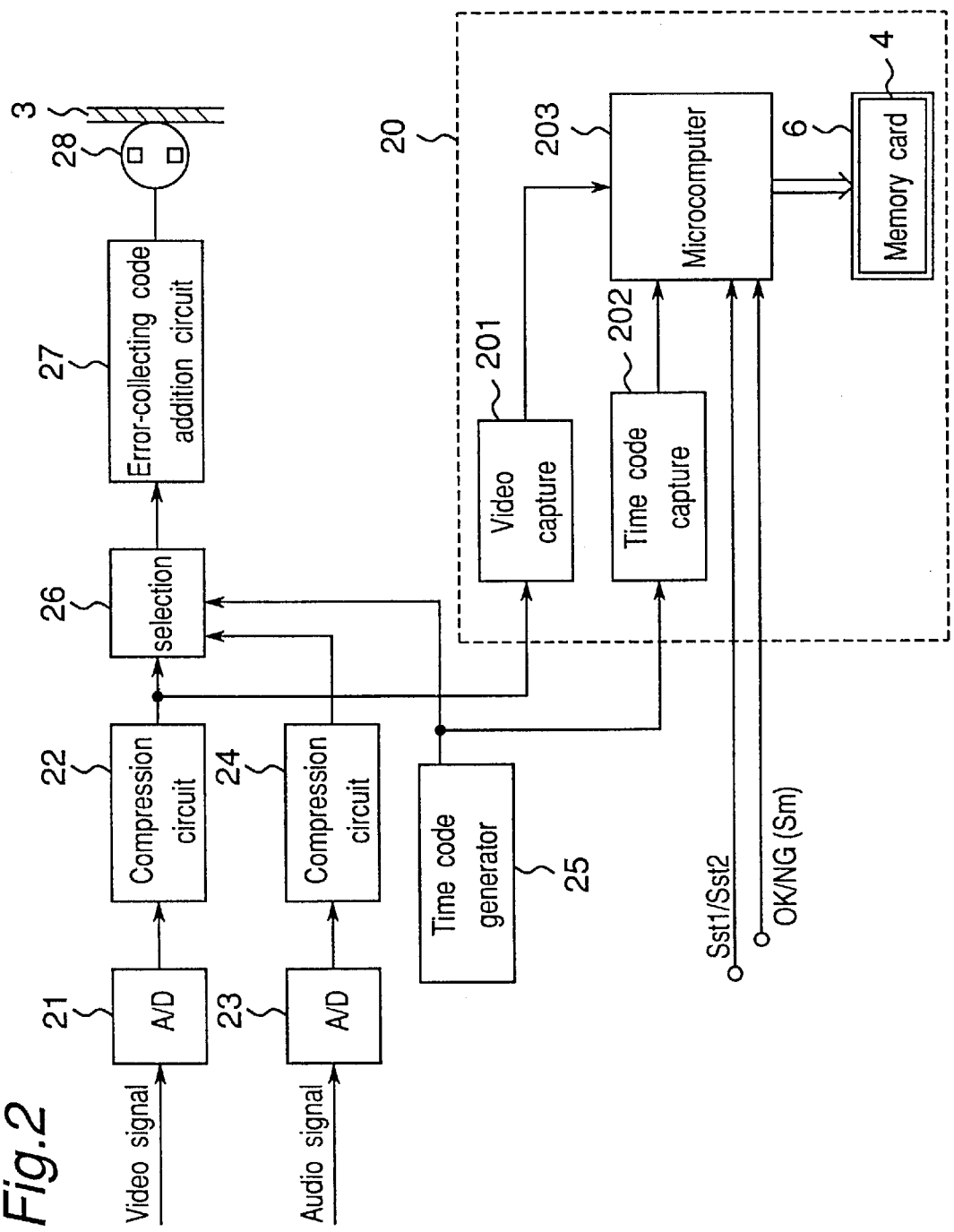
FIG. 2 is a block diagram of a constitution of the VTR collecting system in the embodiment.

FIG. 2 indicates a circuit constitution of the camera-incorporated VTR 5, showing a process of recording photographed and input data.

In FIG. 2, 21 is a first A/D converter for A/D converting photographed input video signals, and the video signals are converted to digital data at the first A/D converter 21 and an output thereof is compressed at a first compression circuit 22. 23 is a second A/D converter for A/D converting audio signals, an output of which is compressed at a second compression circuit 24 for audio signals. 25 is a time code generator simultaneously generating time code data of this record time when video and audio data are recorded to the video tape 3. This process corresponds to addressing to the tape, allowing the operator to access the tape at random in the later edition process.

26 ia a selector which selects in a time-sharing manner video data and audio data output from the corresponding compression circuits 22 and 24 and the time code data generated from the time code generator 25, and an error-correcting code is added to an output of the selector 26 by an error-correcting code addition circuit 27, and the data are then recorded to the video tape 3 by a rotary head 28.

A block diagram 20 represents a memory mechanism having primary features of the present invention, where the video camera is operated, with the memory card 4 used as a memory recording medium for editorial base data being set in the slot 6, to write the editorial base data. A video capture circuit 201 of the memory mechanism 20 takes in, as a still picture, a representative screen among cut scenes of the video data output from the first compression circuit 22. A time code capture circuit 202 takes in time code data of cut scenes of the output data from the time code generator 25 selectively in time.

The video capture circuit 201 and time code capture circuit 202 are set to take data with a timing, for example, in response to a record start/stop signal Sst as a trigger which is generated corresponding to a switching of a photography start (on) and a photography stop (off) by the operator. Specifically, when a microcomputer 203 receives a record start signal Sst1 at the start of a recording operation, the video capture circuit 201 and time code capture circuit 202 responding thereto take the video data and time code data respectively and record the data to the memory card 4 via the microcomputer 203. On the other hand, at the stop time of the recording operation, in response to a record stop signal Sst2, only the data taken by the time code capture circuit 202, namely, only a time code when the recording is stopped is written to the memory card 4 via the microcomputer 203.

An OK/NG marking signal Sm marks while the object is being photographed whether a subject scene is OK or NG through switching of the OK/NG judgment switch 7 of FIG. 1B based on the operator's judgment. The OK/NG marking data are written to the memory card 4 as the OK/NG flag on the basis of the operator's judgment only when the recording operation is stopped, more specifically, immediately after the record start/stop signal Sst changes to the stop signal Sst2.

In the above-described process, various kinds of editorial base data are written to the memory card 4 used as a memory medium for the editorial base data, for example, in a format shown in FIG. 3. In FIG. 3, a cut number is a number of a photographed cut scene, which is set to increment one at every start/stop operation. Data of the representative still picture, a photography start time, a photography stop time and the OK/NG flag are assigned and recorded correspondingly to each cut number. The format of the representative still picture data, photography start time, photography stop time and OK/NG flag is not limited to the order of FIG. 3, for instance, a record format of FIG. 7A may be utilized.

The representative still picture data to be recorded to the memory card 4 is the still picture data at the start time of the recording operation captured by the video capture circuit 201 of FIG. 2 while the start time and stop time to be recorded are the time code data taken by the time code capture circuit 202 of FIG. 2 when receiving the start signal and stop signal. The OK/NG flag is flag data to be written to the memory card 4 via the microcomputer 203 in accordance with the OK/NG marking signal Sm of FIG. 2 through the manipulation of the switch 7.

Other necessary data such as a date of the recording, a title, etc. than the editorial base data in the format of FIG. 3 can be recorded to the IC memory card 4. The IC memory card may be of, e.g., a 64 kilo byte S-RAM.

An edition operation of a video tape with the use of the above memory card 4 will be described with reference to FIGS. 1C and 4.

Figure 4:
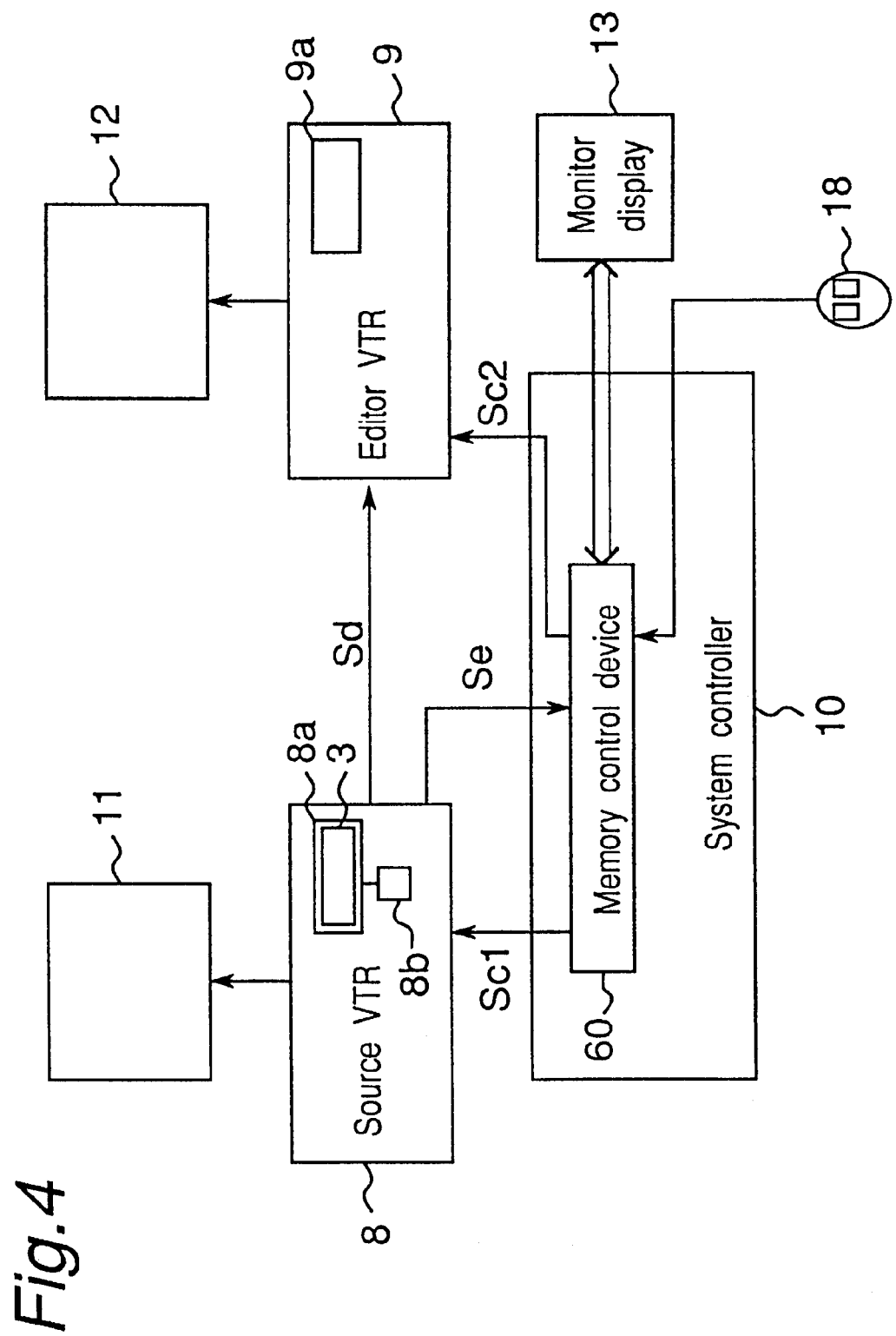
FIG. 4 is a block diagram of a constitution of the VTR editing system of the present invention.

FIG. 4 is a block diagram explanatory of the constitution and operation of the VTR editing system 2. The video tape 3 to which main information is already recorded by the collecting system 1 is set to the video tape loading part 8a of the edition source VTR 8. The memory card 4 having the editorial base data recorded as described with reference to FIG. 1B is inserted into the slot 14 of the system controller 10.

Figure 5:
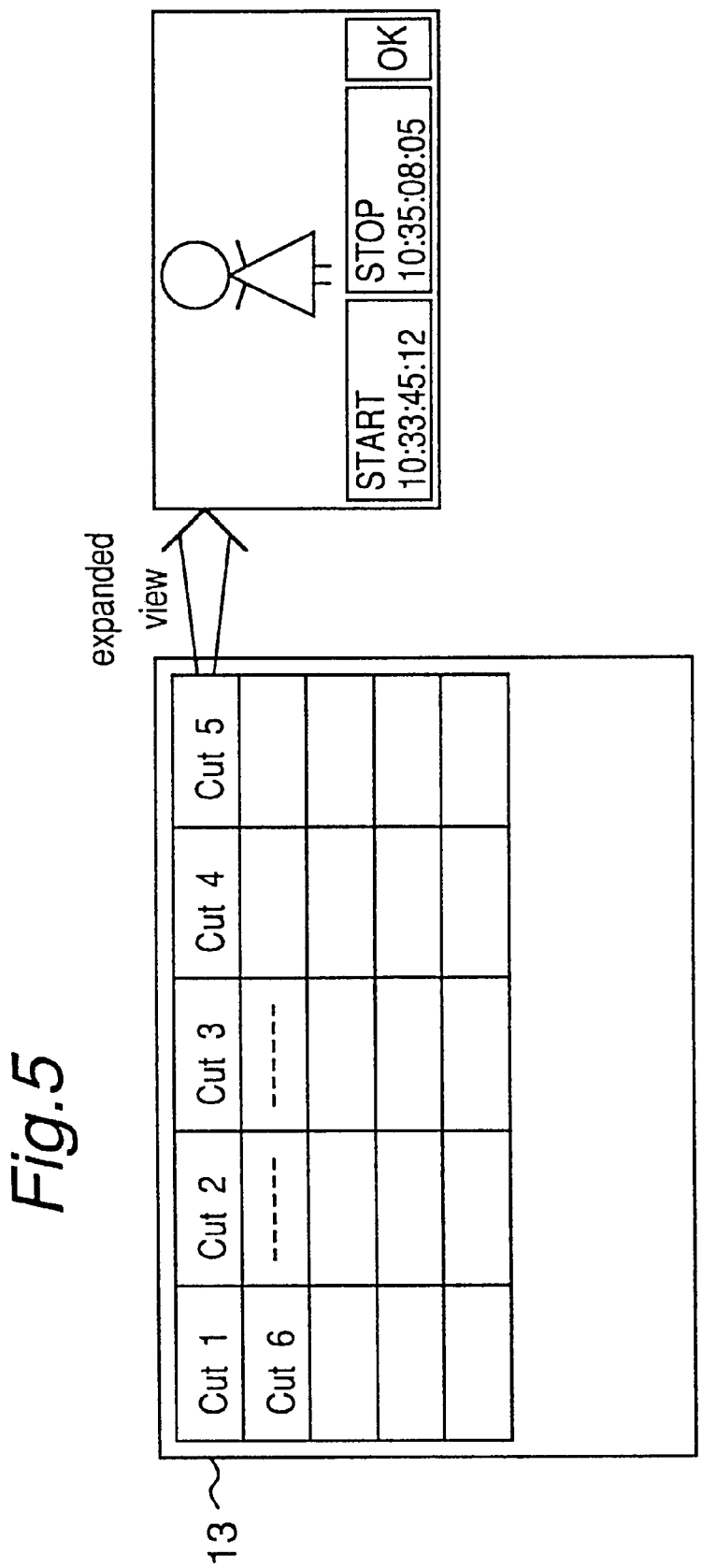
FIG. 5 is a diagram of displays on a display screen by a system controller of the VTR editing system of the present invention.

The operator first instructs the system controller 10 to read editorial base data written in the memory card 4. The controller 10 reads out the base data of the format indicated in FIG. 3 written in the memory card 4 and displays, on the monitor display 13, a screen as shown in FIG. 5, representing a plurality of display blocks each consisting of at least one of the still picture data, start time, stop time and OK/NG flag of each cut number are arranged in the screen.

In FIG. 4, the system controller 10 includes a memory control device 60, wherein signal control lines Sc1 and Sc2 control the source VTR 8 and editor VTR 9, respectively. A signal line Sd is a line to transfer/copy data recorded in the video tape 3 set in the source VTR 8 to a master tape 9a of the editor VTR 9. As will be described later, a signal line Se is installed so as to apply the VTR editing system also to a constitution recording the editorial base data directly to a video tape without using a memory card, whereby the system controller 10 can read out the editorial base data in addition to the main information from the source VTR 8 via the signal line Se.

Figure 6:
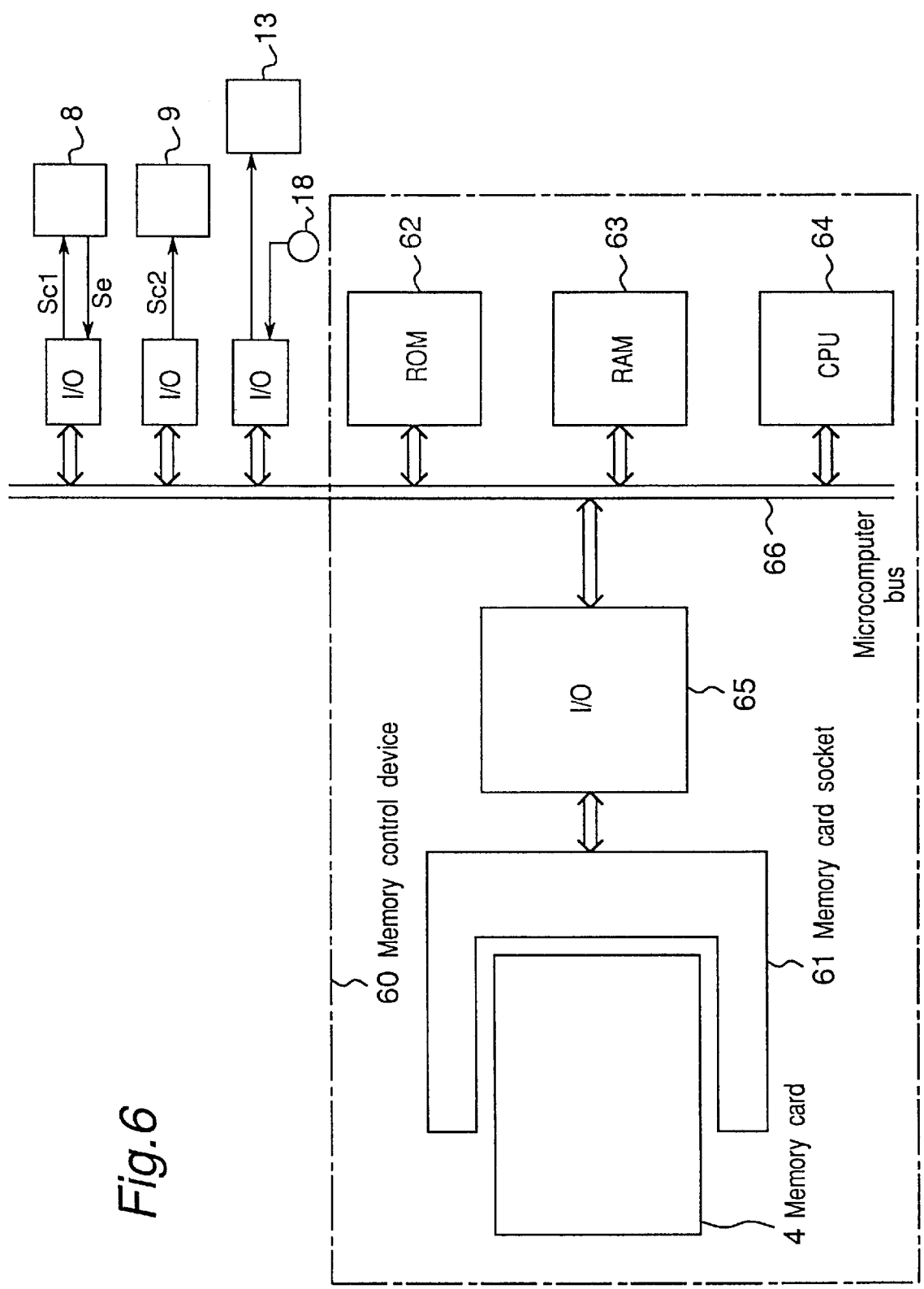
FIG. 6 is a block diagram of a constitution of a memory control section of the system controller of the VTR editing system of the present invention.

FIG. 6 is a block diagram showing a constitution of the memory control device 60 which, in the first embodiment, controls the source VTR 8 and editor VTR 9 while confirming the editorial base data written in the memory card and displayed on the screen of the monitor display 13.

Still referring to FIG. 6, the memory control device 60 has a ROM 62 and a RAM 63 connected in parallel to each other via a bus line 66 and a CPU (microcomputer) 64, and when the memory card 4 is fitted into the card socket 14, the data of the memory card are connected to the ROM 62, RAM 63 and CPU 64 via an I/O device 65. The card socket 14 is constituted of a connector allowing repeated attachment and detachment of the memory card. The bus line 66 is connected via the I/O device to the VTRs 8, 9, monitor display 13 and a mouse 18, and the CPU 64 inputs, outputs and judges data in accordance with a predetermined program preliminarily written in the ROM 62, thereby controlling the VTRs 8 and 9. The RAM 63 is a working area to be used when the CPU 64 operates, which temporarily stores data or inputs, outputs calculated results.

FIGS. 5 is an example of the screen displayed on the monitor display 13 of the controller 10.

As is clear from FIG. 5, the editorial base data such as the representative still picture, a start time code value, a stop time code value, OK/NG flag information, etc. of each cut scene are shown in one display block, and many display blocks are arranged and displayed on one display screen, so that many cut scenes (20 to 30 or more) can be confirmed at a glance, whereby contents recorded in the tape can be detected in a wide range at one time of display.

The operator, looking at the displayed screen of the display 13, instructs the controller 10 with the use of the mouse 18 of FIG. 4 or the like to reproduce a required cut scene, etc., whereby the controller 10 automatically controls the source VTR 8 and editor VTR 9 with comparing time code data generated at the time code generator 25 and recorded as an address and a time code value of the designated cut scene among data recorded in the video tape in the edition source VTR 8, and then the scene of the cut number designated by the controller 10 is reproduced by the source VTR 8 or transferred, copied to the editor VTR 9 from the source VTR 8, as will be described hereinbelow with reference to FIGS. 7A and 7B.

Figure 7:
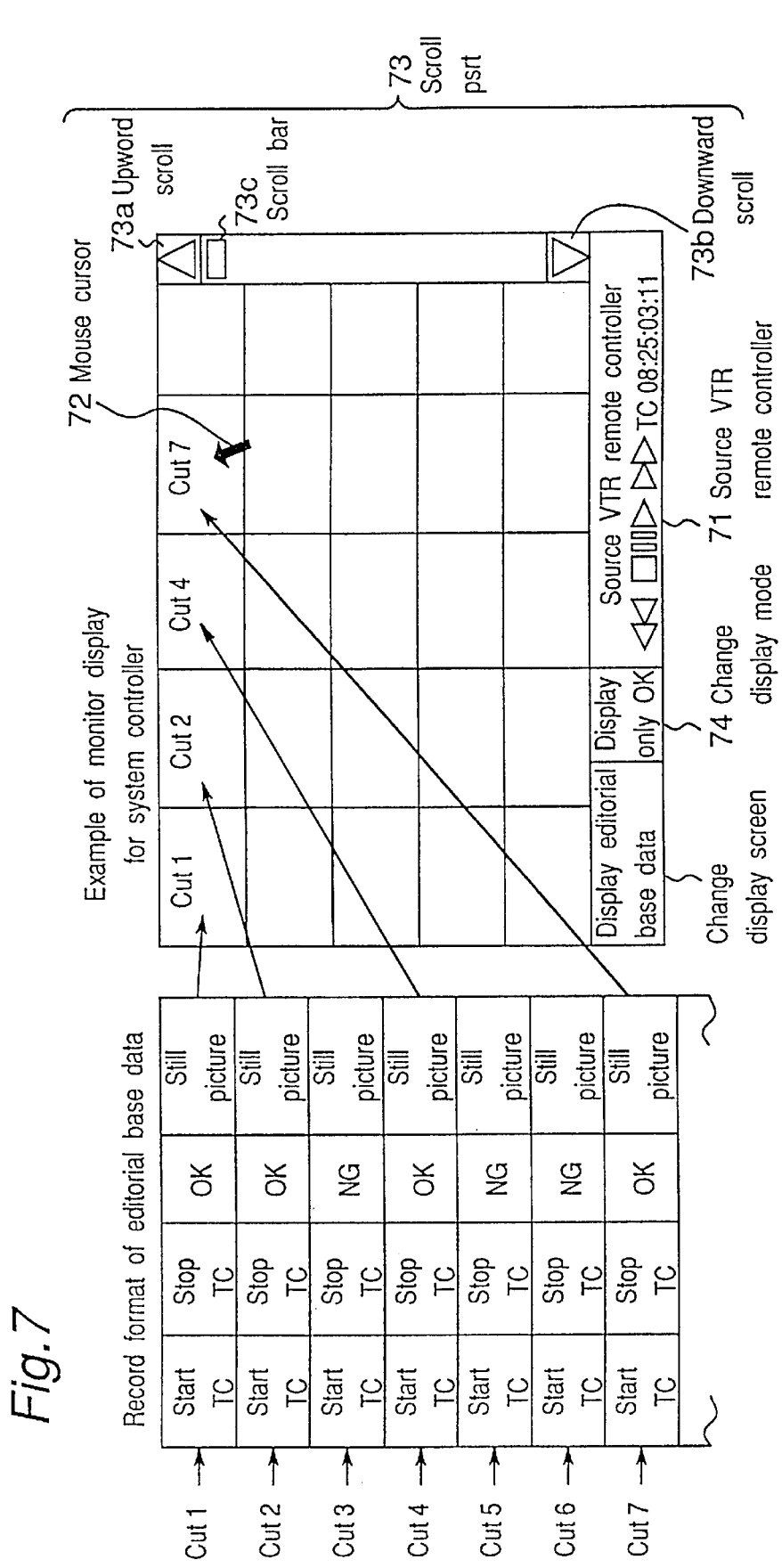
FIG. 7 is an example of a displayed screen of a monitor display for explaining operation procedures of the VTR editing system in the present invention.

FIG. 7 show an example of procedures on the displayed screen of the monitor display 13, i.e., an example when solely cut scenes with OK flags are displayed through the manipulation of a display mode switching part 74 from the screen of a plurality of display blocks on the monitor display in FIG. 5 which is based on data of the memory card read by the controller 10. In the example, scenes of cut numbers 3, 5, 6 show NG flags and therefore are not displayed on the screen.

In the actual editorial work, only a necessary portion of a specific one of the OK scenes recorded in the video tape is taken out, and data of the thus-selected necessary portions are copied from the source VTR 8 to the editor VTR 9, thereby finishing one program, and the manner in which a search is performed for the specific scene in the edition process will now be described below. In the present embodiment, although the OK/NG marking information is displayed or "OK" and "NG", the display form is not limited to this, and various aspects of display are present. For example, displaying as "Mark 1" in the case of OK and "Mark 2" in the case of NG.

In FIG. 7, the source VTR 8 is remote controlled to reproduce recorded data (PLAY) or stop (STOP), etc. when a mouse cursor 72 is moved to a subject mark of a source VTR remote controller part 71 and an operation button of the mouse 18 is clicked. A scroll part 73 shown at the right of the screen is comprised of an upward scroll 73a, a downward scroll 73b and a scroll bar 73c, and in the case where there are too many cut scenes to be accommodated in one screen of the monitor display, the mouse cursor is brought to the subject scroll part and clicked, whereby the displayed screen is moved quickly to display a required cut scene.

In the example of FIG. 7, NG scenes are neglected and still pictures of OK flags alone are displayed, and therefore, a search area is already limited and consequently a working efficiency is fairly improved. When the mouse cursor is then moved to the still picture of the required scene and the mouse switch is clicked, the controller reads a start time of the cut scene of the still picture, and compares it with the present value of the time code of the video tape set in the source VTR 8, namely, the present time code value (TC) displayed at the source VTR remote controller part 71, and judges whether to send the tape forward (fast forward) or rearward (rewind), and transmits a control signal to the source VTR 8 via a control signal line Sc1 (referring to FIG. 4) and searches for a position of the required cut scene at the start time. The operator can thus search and move the recorded screen quickly and easily by merely manipulating the mouse and registering the mouse cursor to the required still picture.

As described hereinabove, according to the first embodiment, representative still pictures, start times, stop times, OK/NG flags, etc. of scenes are recorded as editorial base data to the memory card when the scenes are collected, so that the recorded editorial base data are referred to in the edition process, so that the position of the required scene can be promptly searched for at the edition time without reproducing the video tape from the start to the end, whereby the editorial work is hence carried out speedily and easily.

In the embodiment, although the video capture circuit 201 of FIG. 2 takes in the still picture data at the start time of recording as representative still picture data of cut scenes to be recorded to the memory card 4, the representative still picture is not limited to this, but may be obtained from the cut scenes in the middle of recording or at the stop time point of recording.

Second Embodiment

The editorial base data are recorded to the detachable memory card inserted in the combination camera-VTR in the first embodiment, but in this case, the video tape and memory card should be managed always in pairs.

Figure 8A:
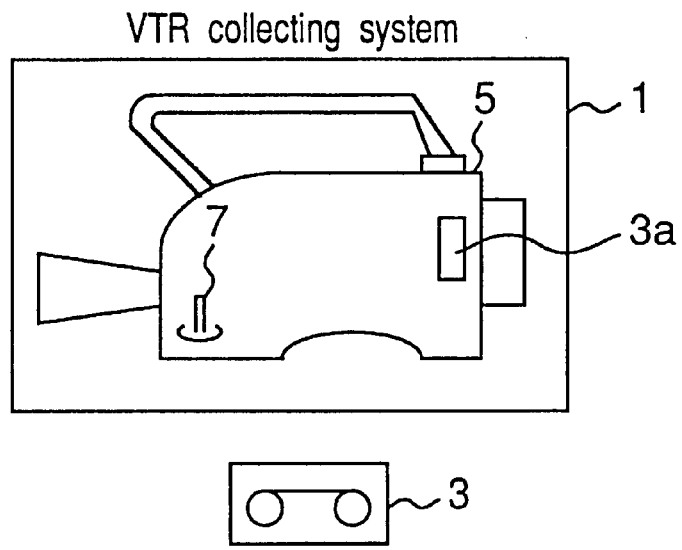
FIGS. 8A and 8B are diagrams of basic constitutions of a camera incorporated VTR collecting system and a VTR editing system according to a second embodiment of the present invention.
Figure 8B:
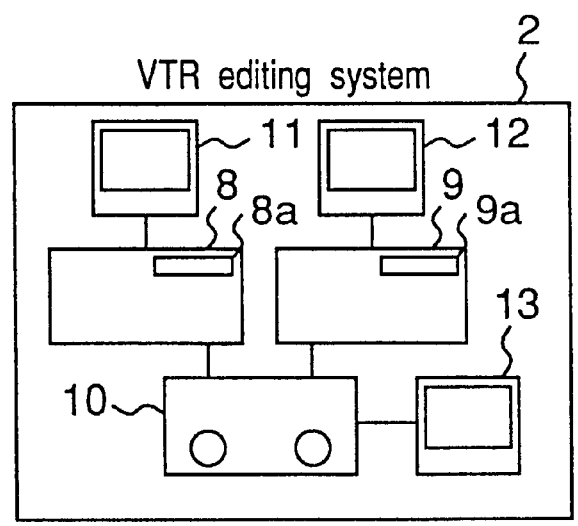

On the other hand, a VTR collecting system and a VTR editing system provided according to a second embodiment of the present invention eliminate the IC memory card, managing recorded data only by the video tape, thereby achieving simple edition of the data, which fundamental constitutions of the systems are indicated in FIGS. 8A and 8B, and a circuit constitution of the VTR collecting system is shown in FIG. 9.

A great difference in constitution of the second embodiment from the first embodiment is to record editorial base data to the video tape via a built-in temporary storage memory without using the IC memory card 4 which is employed in the first embodiment as the memory device for the editorial base data, and since the constitution in other points is the same as in the first embodiment, the description of the fundamental constitutions shown in FIGS. 8A and 8B is omitted here to avoid the repetition.

Referring to FIG. 9, in place of using the memory card, a temporary storage memory 94 connected to the microcomputer 203 or incorporated in the microcomputer 203 is provided in the memory mechanism 20, and the editorial base data such as representative still pictures, start times, stop times, OK/NG flags and the like of the scenes are temporarily recorded to the temporary storage memory 94. Similar to the first embodiment, the editorial base data are recorded at this time in the format of FIG. 3. The editorial base data temporarily written to the memory are read out before the video tape is taken outside from the video camera at the end of the photography and recorded to the video tape to which the main information has been already recorded.

In other words, when the object is finished to be photographed, the microcomputer 203 reads out data temporarily stored in the memory 94, outputs as an editorial base data De, transmits to the selector 26 and records to the video tape 3 via the error-correcting code addition circuit 27 and rotary head 28. Since the editorial base data De have been stored in the memory 94 until then, the start/stop time code value, representative still picture and OK/NG flag of every cut scene are copied as they are to the video tape. The other same points and operations as in the first embodiment will not be duplicated here.

An operation when the video tape is edited will be described with references to FIGS. 4 and 6, similar to the first embodiment.

The edition source VTR 8 first reads the editorial base data recorded in the video tape 3. For the reading, the video tape 3 is inserted into the source VTR 8, and this insertion of the tape is detected by an insertion detection and automatic read device 8b, and the editorial base data recorded in the tape are automatically started to be read, transmitted to the system controller 10 via the signal line Se and stored in RAM 63 of the memory control device 60. Controlling of the capturing operation of the data is carried out as the CPU 64 controls the I/O device for the source VTR 8 in accordance with a predetermined program in ROM 62. Therefore, the system controller 10 can read the editorial base data along with the main information from the edition source VTR 8 via the signal line Se. When receiving the editorial base data transmitted from the source VTR 8, the system controller 10 combines at least one of the still picture data, start time, stop time and OK/NG flag for every cut number, thereby displaying the screen as shown in FIG. 5.

The fundamental constitution and operation of the VTR editing system 2 related to FIGS. 4 through 7 are the same as in the first embodiment, except that the editorial base data are recorded to the videotape itself without using the IC memory card, and the duplicate description of the same parts will be avoided here.

Figure 10:
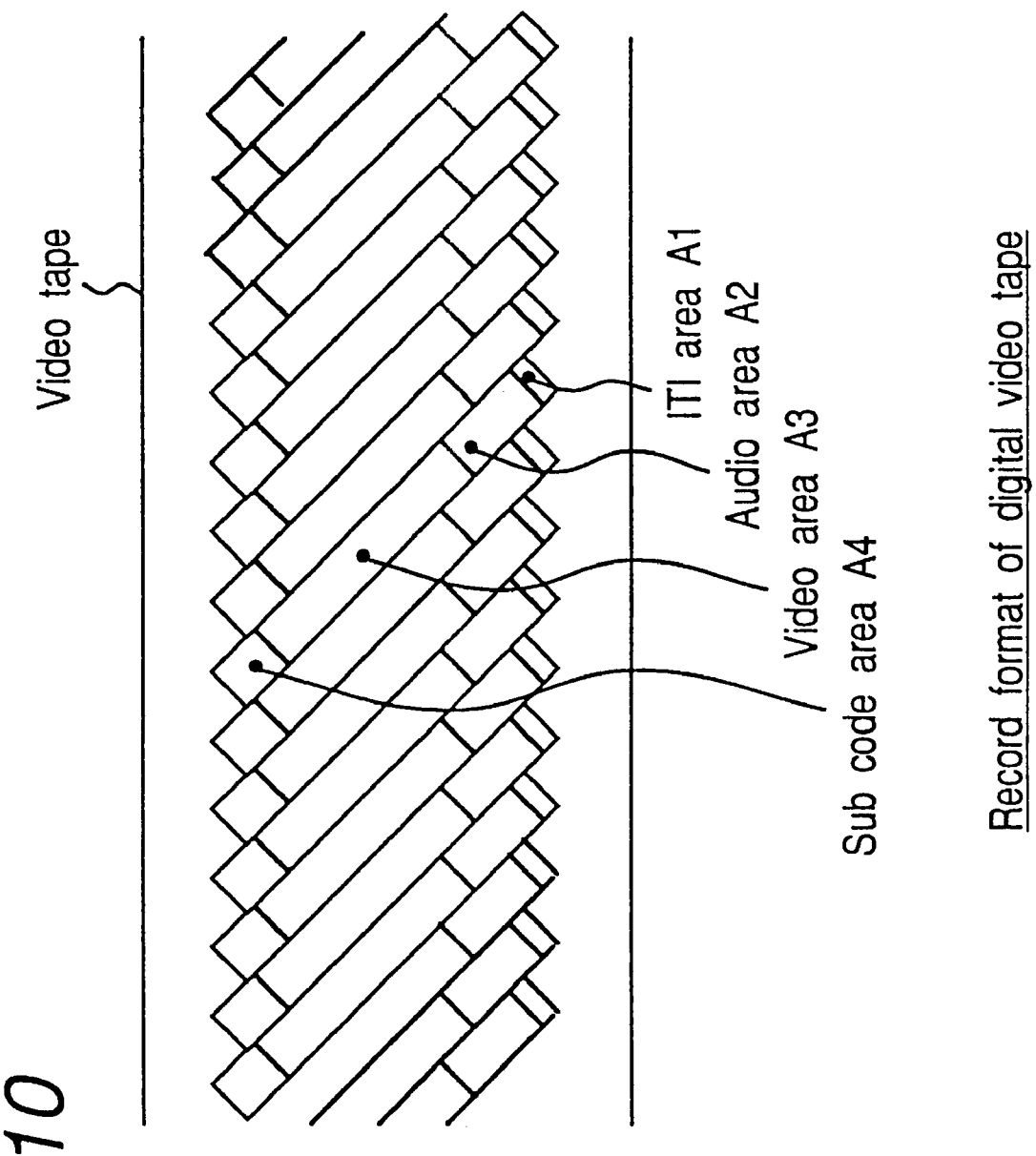
FIG. 10 is a diagram of a data record format of a digital video tape used in the second embodiment.

FIG. 10 indicates a record format of the video tape according to the present embodiment. In the video tape of FIG. 10 are sequentially allotted, from a lower end of each recording track an insert and track information (abbreviated as ITI) record area A1, an audio area A2, a video area A3 and a sub code area A4. The editorial base data are recorded to the sub code area A4 in the embodiment.

Figure 11:
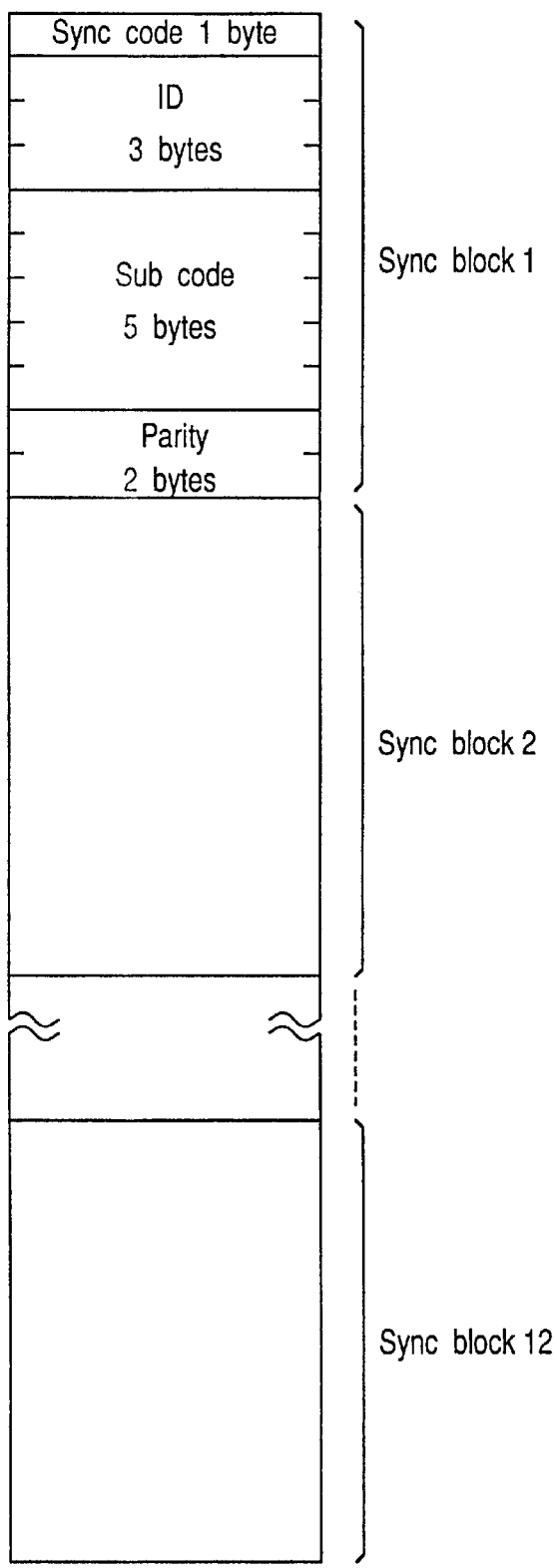
FIG. 11 is a diagram of a record format of information in one track of a sub code area according to the data record format in FIG. 10.

A record format of data written to the sub code area A4 is indicated in FIG. 11.

As is shown in FIG. 11, the sub code area includes, in one track, data of 12 sync blocks, where each 11-byte sync block is constituted of a 1-byte sync code, a 3-byte ID, a 5-byte sub code and a 2-byte parity. Information is freely written to a region of the sub code (5 bytes) of each sync block, which is determined by a DVC PRO format. A method of writing editorial base data with the use of the sub code region (5 bytes) will be depicted below.

Figure 12A:
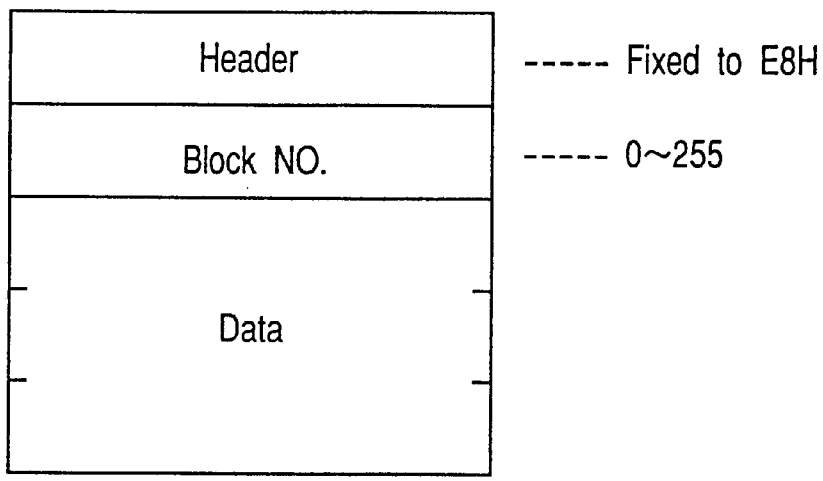
FIG. 12A is a diagram explanatory of information of a 5-byte sub code in a sync block of FIG. 11.
Figure 12B:
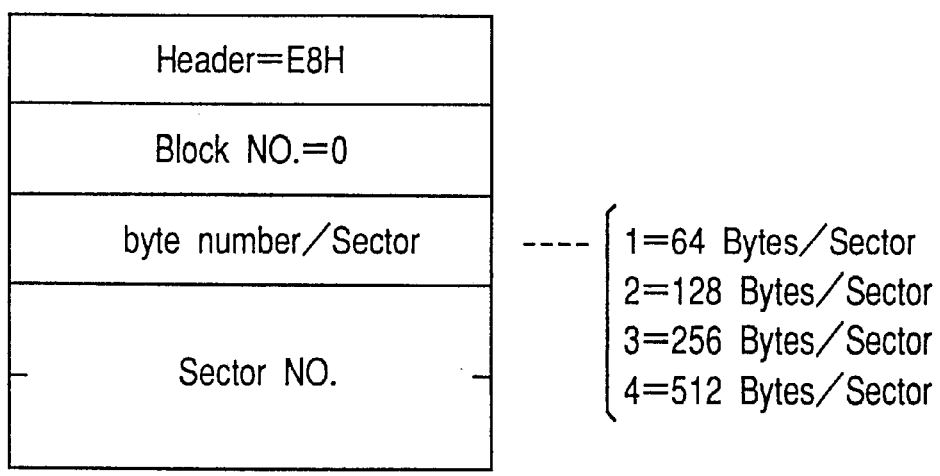
FIG. 12B is a diagram of a record format when a block number is 0 in FIG. 12A.

FIG. 12A illustrates a data format paying attention to the sub code (5 bytes). As is clear from FIG. 12A, the sub code of 5 bytes is comprised of three recording sections, i.e., a header, a block number and data, and the header is fixed at E8H, and a block number is given with numbers of 0 to 255, and the remaining 3 bytes are assigned to the data section. A block NO. of 0 has a special meaning for managing of sectors, and 1 byte of the 3-byte data section is set to show a count of bytes per sector and the other 2 bytes indicate a sector NO. In the practical use, when the count of bytes is 1, this means that there are 64 bytes per sector, and likewise, the count of bytes of 2 represents 128 bytes per sector, the count of bytes of 3 equals 256 bytes per sector and the count of bytes of 4 equals 512 bytes per sector.

Figure 13:
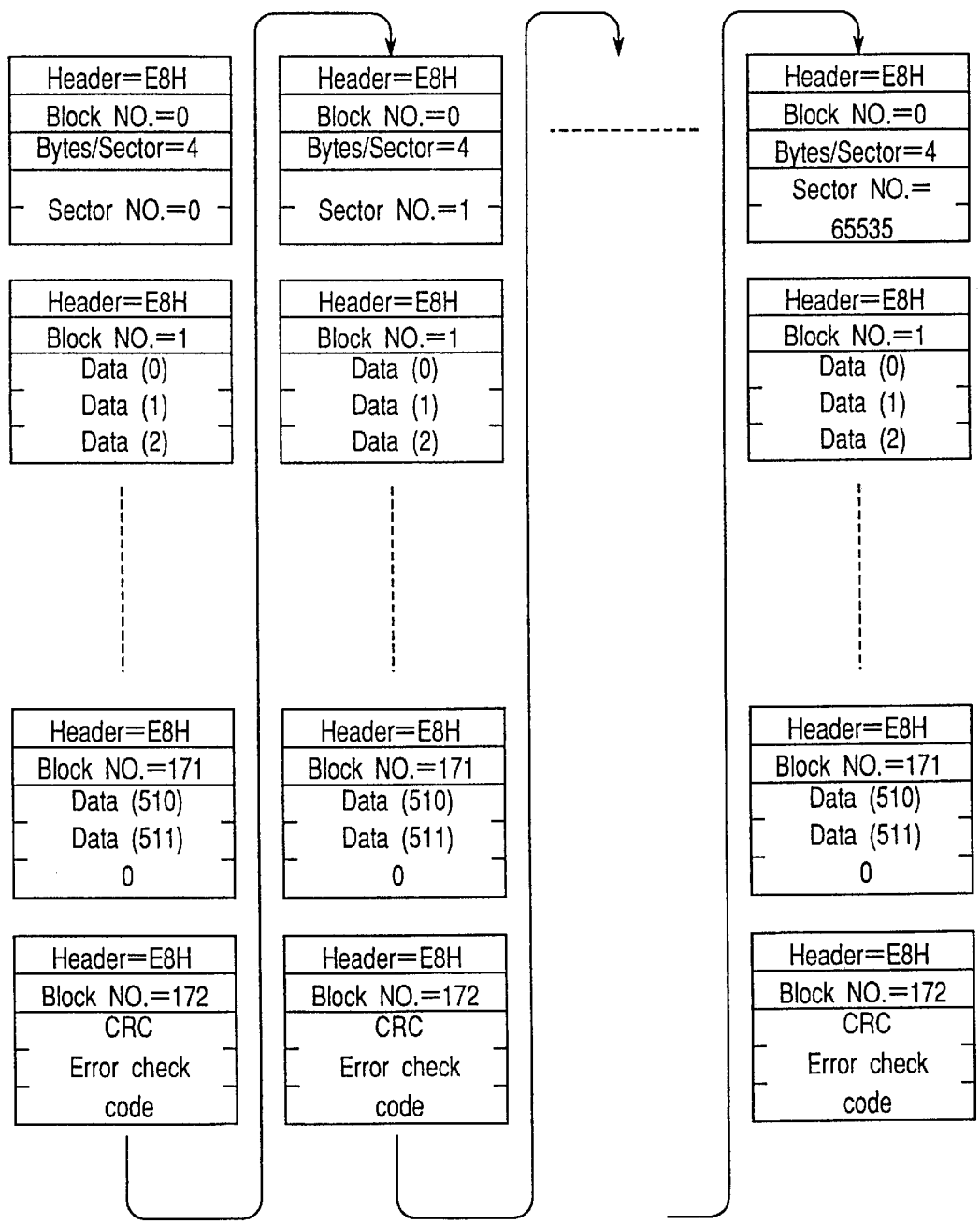
FIG. 13 is a diagram of a data record format when many sectors are coupled in FIG. 12B.

By setting the data format as described above, a lot of information can be managed as shown in FIG. 13.

In FIG. 13, the count of bytes per one sector is 4 and accordingly, data are arranged by 512 bytes per sector, and in the case of FIG. 13, for instance, data of the sector NO.=0 uses from the block NO.=1 to the block NO.=171 (a third data in the block NO.=171 is a dummy data), and a CRC error check code of 3 bytes is added in the block NO.=172. Similarly, when depicting an arrangement to the maximum sector number 65535 represented by 2 bytes as sector No.=1, sector No.2 . . . , a total count of recordable data becomes 512 bytes per sector ×65536 sectors which is a maximum count of sectors, i.e., 33554432 bytes.

The manner in which to allot the editorial base data to the sectors of FIG. 13 will be described next.

Data corresponding to one cut scene of the editorial base data are composed as follows.

- 4 bytes of the time code of the start time point, specifically, hour, minute, second and frame bytes;
- 4 bytes of the time code of the stop time point, specifically, hour, minute, second and frame bytes;
- 1 byte of the OK/NG flag;
- 5400 bytes of color signals of 90×60 pixels; and
- 5400 bytes of luminance signals of 90×60 pixels of the still picture.

FIG. 14 is an explanatory diagram of the above 10809 bytes of data allotted.

All of the start time code, stop time code and OK/NG flag are combined and allotted to 1 sector, and the still picture color signals and still picture luminance signals are allotted to 11 sectors respectively. In the meantime, the three allotted areas are not always fully filled with valid data, and therefore dummy data are written to the residual area so as to keep the whole of the sectors full. Information of one cut scene is thus recorded in the 23 sectors.

According to the data record format on a tape of the present embodiment, one track is comprised of the insert and track information (ITI) area, audio data area, video data area and sub code record area, where for example, 10 tracks constitute one frame of the video tape, and ITI functions as a reference signal for the edition process. Since the video tape of the above-described format has the cassette memory built therein for recording the editorial base data, the video tape realizes high edition accuracy together with the time codes stored in the sub code area. Moreover, only OK scenes can be automatically extracted from the video tape at the edition time if an OK/NG judgment flag is written to the memory medium.

According to the present embodiment as discussed above, the editorial base data are recorded to the video tape itself when data are collected, and therefore, a position of a required scene can be searched for promptly and easily with is the use of the video tape only, without using the memory card, and the VTR editing system achieved is highly practical and efficient for the editorial work.

In addition, an edition data parallel record function enabling efficient use of the photographed videos at the edition time may be provided in the system, and when editorial base data, e.g., reel numbers, cut numbers, take numbers, mark IN/OUT points, queue points, time codes, OK/NG flags, still pictures and the like are adapted to be recorded together with the images when the videos are photographed, a required video can be pinpointed at one glance at the edition time, thus largely improving edition efficiency.

Both the photography start time point and the photography stop time point are taken as time codes of the editorial base data in the embodiments of the present invention, but the time codes are not restricted to the above, and at least either one of the time points may be recorded as the time code.

When the edition data parallel record function is installed, only the data can be transferred instantaneously from the camera-VTR system to the editing system before uploading of videos of the camera-VTR to the editing system. Only required ones of the still pictures recorded in the video tape can be efficiently extracted as edition materials and then uploaded to the editing system while being confirmed on a graphical user interface of the editing system. Quick rough edition becomes practicable.

INDUSTRIAL APPLICABILITY

As described above, according to the present invention, the editorial base data are recorded to the memory means when the data are collected, and the recorded base data are displayed at the edition time, thus making it possible to search for a position of a necessary scene promptly without reproducing the video tape from the start to the end, and thus the VTR system enables quick and easy editorial work with considerably high practical effects.

Additionally, the editing system can preserve data in a perfect complete state as digital data, facilitating manufacture for not only conventional video tapes, but video CDs, CD-ROMs, VODs and the like main information software, and the system is utilizable as a production system for multimedia contents realizing development for various media, having a compact and light-weight structure with improved mobility in comparison with conventional camera-VTRs.

While VTR is described as a recording and reproducing apparatus for video images in the embodiments, a magneto-optical disc or semiconductor memory, etc. can be used as a video image recording medium.

What is claimed is:

1. A camera-incorporated VTR collecting system for collecting video/audio information including a video camera section operable to photograph an object and take video and audio information of the object, said system comprising:
    a data recording/reproducing section operable to record and reproduce the video and audio information taken by said video camera section to and from a recording medium;

an auxiliary data memory section operable to store editorial auxiliary data associated with each cut scene of the video and audio information to be referred to in a process of editing the video/audio information;

a memory control section operable to control said auxiliary data memory section, wherein, when the video and audio information is recorded by said data recording/reproducing section, the editorial auxiliary data is written into said auxiliary data memory section under the control of said memory control section; and an OK/NG designating unit operable to designate an OK/NG flag as one of the editorial auxiliary data assigned to each cut scene of the video and audio information, wherein said OK/NG designating unit designates the OK/NG flag in real time during a photographing operation of said video camera section;

wherein said memory control section is operable to write the OK/NG flag to said auxiliary data memory section in response to a switching of said OK/NG designating unit between a photography start and a photography stop of said video camera section; and wherein said auxiliary data memory section comprises a memory card, and said memory control section is operable to write the OK/NG flag to said memory card after the photography stop of said video camera section.

2. The camera-incorporated collecting system of claim 1, wherein said data recording/reproducing section is operable to record the video/audio information to a video tape as a recording medium and has a time code generating device which is operable to simultaneously generate time code data of this record time when the video/audio information is recorded to the video tape.

3. The camera-incorporated VTR collecting system of claim 2, wherein said memory control section has an auxiliary data memory control device which is operable to control a timing of writing the editorial auxiliary data to said auxiliary data memory section and a timing of reading thereof.

4. The camera-incorporated VTR collecting system of claim 3, wherein the auxiliary data memory control device is operable to write the editorial auxiliary data to said auxiliary data memory section in response to a switching of a photography start and a photography stop of said video camera section.

5. The camera-incorporated VTR collecting system of claim 3, wherein at least one of time code information when each cut scene is started to be recorded and time code information when the recording of each cut scene is stopped is written as the editorial auxiliary data into said auxiliary data memory section.

6. The camera-incorporated VTR collecting system of claim 2, wherein said memory control section has a video capture device operable to take a representative screen of each cut scene of the video information as a still picture and a time code capture device operable to time-selectively take time code data of cut scenes from time code data output from said time code generating device, whereby the representative still pictures output from said video capture device and time code information output from said time code capture device are written as editorial auxiliary data into said auxiliary data memory section.

7. The camera-incorporated VTR collecting system of claim 6, wherein at the start of recording, the representative still picture and corresponding time code information of each cut scene output from said video capture device and said time code capture device are recorded as editorial auxiliary data to said auxiliary data memory section under the control of said auxiliary data memory control device.

8. The camera-incorporated VTR collecting system of claim 7, wherein at the stop of recording, time code information at the time point is recorded as editorial auxiliary data to said auxiliary data memory section under the control of said auxiliary data memory control device.

9. A camera-incorporated VTR collecting method for collecting video/audio information, said method comprising:

photographing an object and taking video and audio information of the object using a video camera;

recording each cut scene of the video and audio information taken by the video camera to a recording medium;

storing editorial auxiliary data associated with each cut scene to an auxiliary data memory section to be referred to in a process of editing the video/audio information, wherein the editorial auxiliary data is written into the auxiliary data memory section when the video and audio information is recorded to the recording medium; and designating an OK/NG flag as one of the editorial auxiliary data assigned to each cut scene of the video and audio information in real time during a photographing operation of the video camera, thereby indicating whether each cut scene is OK or NG;

wherein the OK/NG flag is written to the auxiliary data memory section in response to a switching between a photography start and a photography stop of the video camera; and wherein the OK/NG flag is written to a memory card of the auxiliary data memory section after the photography stop of the video camera.

10. The method of claim 9, wherein the video/audio information is recorded to a video tape as a recording medium and time code data of this record time is simultaneously generated when the video/audio information is recorded to the video tape.

11. The method of claim 10, further comprising controlling a timing of writing the editorial auxiliary data to the auxiliary data memory section and reading thereof.

12. The method of claim 11, further comprising writing the editorial auxiliary data to the auxiliary data memory section in response to the switching of a photography start and a photography stop of the video camera.

13. The method of claim 11, wherein at least one of time code information when each cut scene is started to be recorded and time code information when the recording of each cut scene is stopped is written as the editorial auxiliary data into the auxiliary data memory section.

14. The method of claim 10, further comprising taking a representative screen of each cut scene of the video information as a still picture and time-selectively taking time code data of cut scenes from time code data simultaneously with the generating of the record time, whereby the representative still pictures and time code information are written as editorial auxiliary data into the auxiliary data memory section.

15. The method of claim 14, wherein at the start of recording, the representative still picture and corresponding time code information of each cut scene are recorded as editorial auxiliary data to the auxiliary data memory section.

16. The method of claim 15, wherein at the stop of recording, time code information at the time point is recorded as editorial auxiliary data to the auxiliary data memory section.

17. A VTR editing system comprising:

an edition source VTR operable to have an information recording medium loaded thereto and operable to read and reproduce data including video and audio main information which have already been recorded and collected therein by a camera-incorporated VTR collecting system;

an editor VTR, coupled to said edition source VTR, to which the main information recorded in the information recording medium is transferable for dubbing; and a system control device operable to read editorial auxiliary data from an auxiliary data recording medium recording the editorial auxiliary data, thereby controlling said edition source VTR and said editor VTR with reference to the editorial auxiliary data;

wherein the editorial auxiliary data includes an OK/NG flag designated by an OK/NG designating unit of a video camera assigned to each cut scene of the video and audio information, wherein the OK/NG flag is designated in real time during a photographing operation of the video camera;

wherein a main information portion necessary for an edition process among the data recorded in the information recording medium loaded to said edition source VTR is selectively dubbed and edited;

wherein said system control device has a monitor display device operable to display still picture data, at least one information of recording start and stop times, and an OK/NG flag for each cut scene as the read editorial auxiliary data in one display block, so that a plurality of display blocks are arranged and displayed on one display scene; and wherein said VTR editing system comprises a memory card, and said system control device is operable to write the OK/NG flag to said memory card after a stop of the photographing operation of the video camera.

* * * * *